US007597252B1

(12) United States Patent
Dewitt

(10) Patent No.: US 7,597,252 B1
(45) Date of Patent: Oct. 6, 2009

(54) FUEL PUMPING SYSTEM AND METHOD

(76) Inventor: Mike R. Dewitt, 25679 478th Ave., Sioux Falls, SD (US) 57104

( * ) Notice: Subject to any disclaimer, the term of this patent is extended or adjusted under 35 U.S.C. 154(b) by 559 days.

(21) Appl. No.: 11/279,829

(22) Filed: Apr. 14, 2006

(51) Int. Cl.
*G06F 7/08* (2006.01)

(52) U.S. Cl. ........................ 235/381; 235/384; 235/380

(58) Field of Classification Search ................. 235/375, 235/380, 382, 384, 381
See application file for complete search history.

(56) References Cited

U.S. PATENT DOCUMENTS 3,814,148 A 6/1974 Wostl
4,345,146 A 8/1982 Story et al.
4,469,149 A * 9/1984 Walkey et al. ................ 141/94
5,605,182 A 2/1997 Oberrecht et al.
5,729,002 A * 3/1998 Samples ................ 235/462.01
5,857,501 A 1/1999 Kelerich et al.
6,085,805 A 7/2000 Bates
6,157,871 A 12/2000 Terranova
6,213,393 B1 * 4/2001 Streicher et al. ............ 235/381
6,374,870 B1 4/2002 Muller
6,446,049 B1 9/2002 Janning et al.
6,470,233 B1 10/2002 Johnson, Jr.
6,497,363 B1 12/2002 Kelrich
6,571,151 B1 5/2003 Leatherman
6,618,362 B1 9/2003 Terranova
6,882,900 B1 4/2005 Terranova

* cited by examiner

*Primary Examiner*—Karl D. Frech

(57) ABSTRACT

A fuel pumping system includes at least one fuel pump including a fuel nozzle. Each of a plurality of vehicles has a vehicle identification positioned thereon and each of the vehicles has a panel mounted thereon. The panels each have different barcode indicia thereon having information encoded therein corresponding to one of the vehicle identifications. A barcode scanner retrieves the information encoded in the barcodes. A database stores a plurality of datasets. Each of the datasets includes information from one of the barcode indicia and a corresponding one of the vehicle identifications. The database is operationally coupled to the at least one fuel pump and allows the at least one fuel pump to pump fuel when the fuel nozzle is actuated and the information retrieved by the barcode scanner corresponds to one of the datasets stored in the database.

9 Claims, 5 Drawing Sheets

FUEL PUMPING SYSTEM AND METHOD

BACKGROUND OF THE INVENTION

1. Field of the Invention

The present invention relates to fuel pumping devices and more particularly pertains to a new fuel pumping device for preventing the theft of gasoline or other vehicle fuel from a fueling station by matching the identification of a vehicle to a stored set of vehicle identifications before the user of the pumping device is allowed to pump fuel.

2. Description of the Prior Art

The use of fuel pumping devices is known in the prior art. While these devices fulfill their respective, particular objectives and requirements, the need remains for a device that allows a person, who wishes to fuel their vehicle, to pump fuel into their vehicle before paying cash or with an electronic transfer of funds. Current fueling stations typically allow three methods of payment. One is by electronic funds transfer, either with a credit card or debit card, which is swiped by the fueling pump before it can be actuated. A second is by paying a cashier cash or check and then actuating the fueling pump after it is turned on by the cashier. This second method is not advantageous, as it necessitates the consumer knowing how much fuel they are going to pump, limits the amount of fuel pumped, and requires the consumer to go back to the cashier if the consumer is to receive any change.

A third method is to allow a person to first pump their desired amount of fuel and then have that person pay for the fuel once they are finished. This is a convenient for many persons, particularly those who do not have or do not like to use credit cards at a fueling station, but it involves high incidence of theft to the merchant from unscrupulous consumers who fuel their vehicles and then leave without paying. For this reason, a new system and method are required which allow a person to fuel their vehicle and pay for the fuel when they are finished fueling while also protecting the property interests and rights of the merchants.

SUMMARY OF THE INVENTION

The present invention meets the needs presented above by generally comprising at least one fuel pump including a fuel nozzle. Fuel is dispensable from the fuel nozzle when the fuel nozzle is actuated. A plurality of vehicle identifications is provided and each of a plurality of vehicles has one of the vehicle identifications positioned thereon. Each of a plurality of panels has different barcode indicia thereon. Each of the barcode indicia has information encoded therein corresponding to one of the vehicle identifications. The panels are mounted adjacent to a fuel receiving port of a corresponding one of the vehicles. A barcode scanner is mounted is configured for scanning each of the barcode indicia and retrieving the information encoded therein. A database is in communication with the barcode scanner and is configured to store a plurality of datasets. Each of the datasets includes information from one of the barcode indicia and a corresponding one of the vehicle identifications. The database is operationally coupled to the at least one fuel pump and allows the at least one fuel pump to pump fuel when the fuel nozzle is actuated and the information retrieved by the barcode scanner corresponds to one of the datasets stored in the database.

The present invention further meets the needs presented above by generally comprising a method that includes providing a vehicle that has a fuel receiving port. A fuel pump includes a fuel nozzle and fuel is dispensable from the fuel nozzle when the fuel nozzle is actuated. Vehicle identification is provided which is positioned on the vehicle. A panel is provided that has barcode indicia thereon. The barcode indicia has information encoded therein corresponding to the vehicle identification. The panel is mounted adjacent to the fuel receiving port. The panels has a first side and a second side. The first side has the barcode indicia thereon and the second side has an adhesive thereon. The adhesive secures the panel to the vehicle. A barcode scanner is provided, which is mounted on the fuel nozzle. The barcode scanner is configured for scanning the barcode indicia and retrieving the information encoded therein. A database is in communication with the barcode scanner and stores a dataset. The dataset includes information from the barcode indicia and the vehicle identification. The database is operationally coupled to the fuel pump and allows the fuel pump to pump fuel when the fuel nozzle is actuated and the information retrieved by the barcode scanner corresponds to the dataset stored in the database. In this manner, fuel may only be dispensed from the fuel nozzle when the information retrieved by the scanner is stored in the database. The barcode is scanned with the barcode scanner. The information retrieved on the barcode is matched with the dataset. The fuel nozzle is actuated and fuel pumped into the fuel receiving port after the information retrieved matches the dataset.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
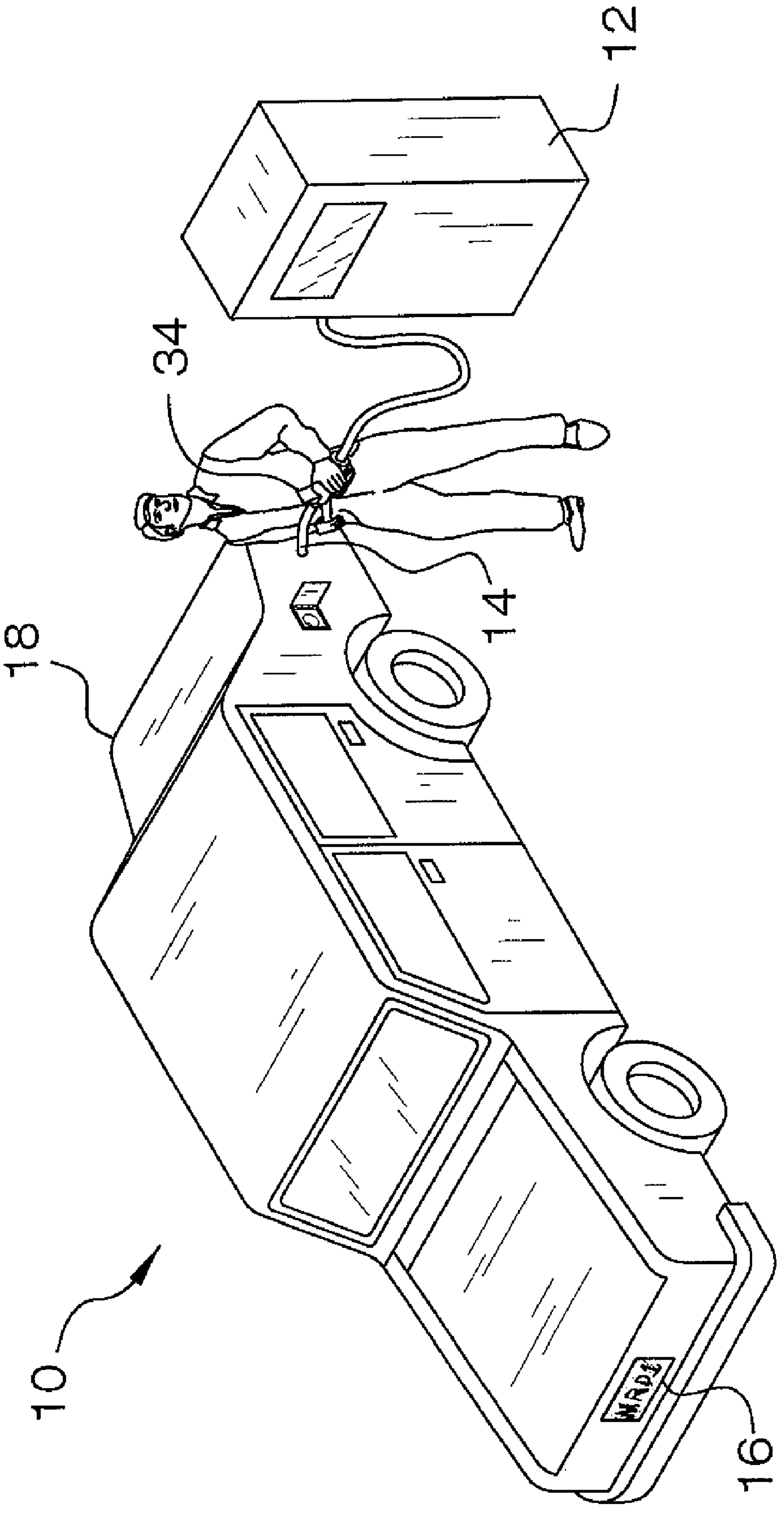
FIG. 1 is an in-use perspective view of a fuel pumping system and method according to the present invention.
Figure 2:
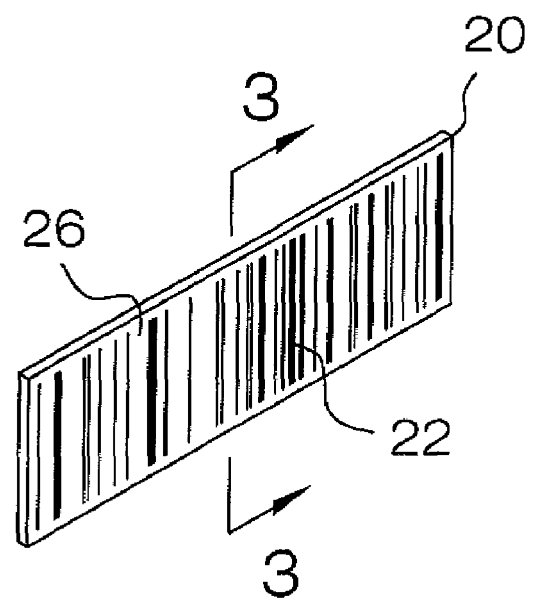
FIG. 2 is a perspective front view of a panel of the present invention.
Figure 3:
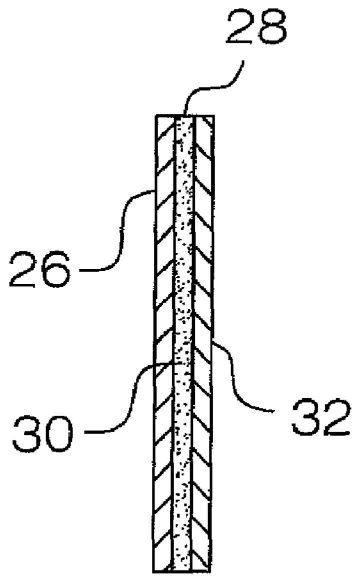
FIG. 3 is a cross-sectional view taken along line 3-3 of FIG. 2 of the present invention.
Figure 4:
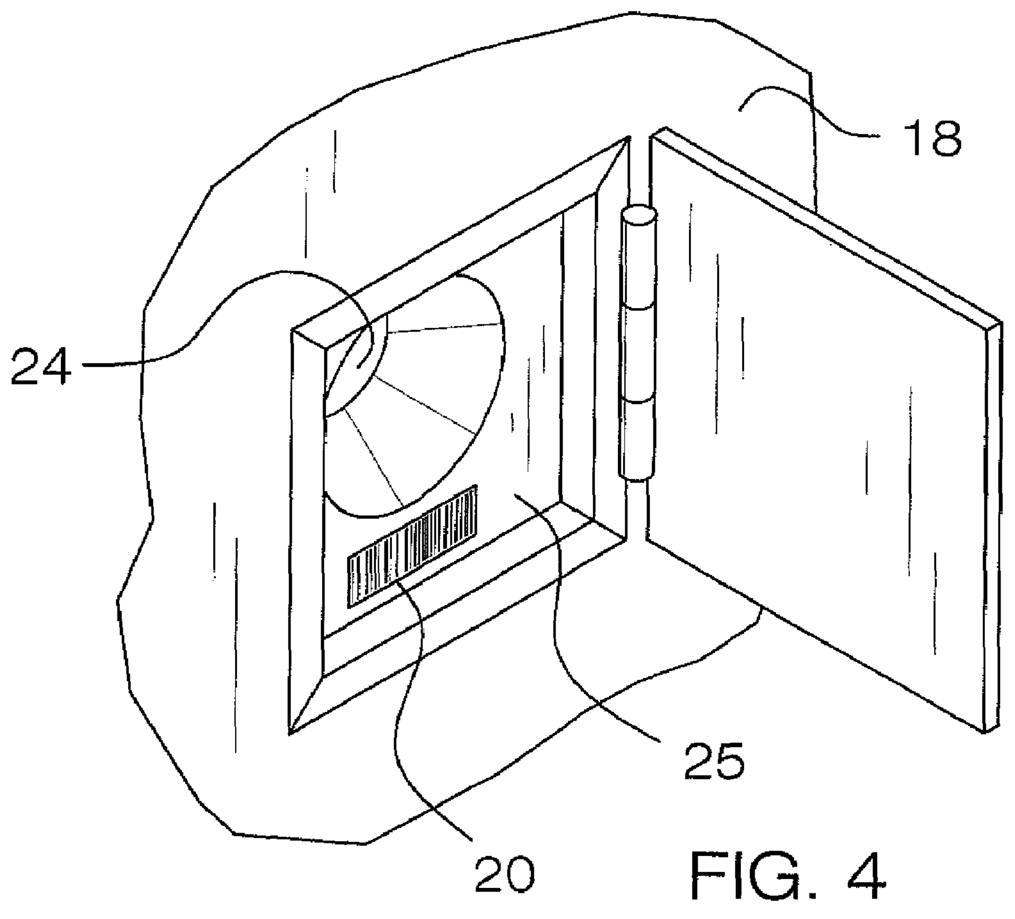
FIG. 4 is a perspective front view of a fuel port the present invention.
Figure 5:
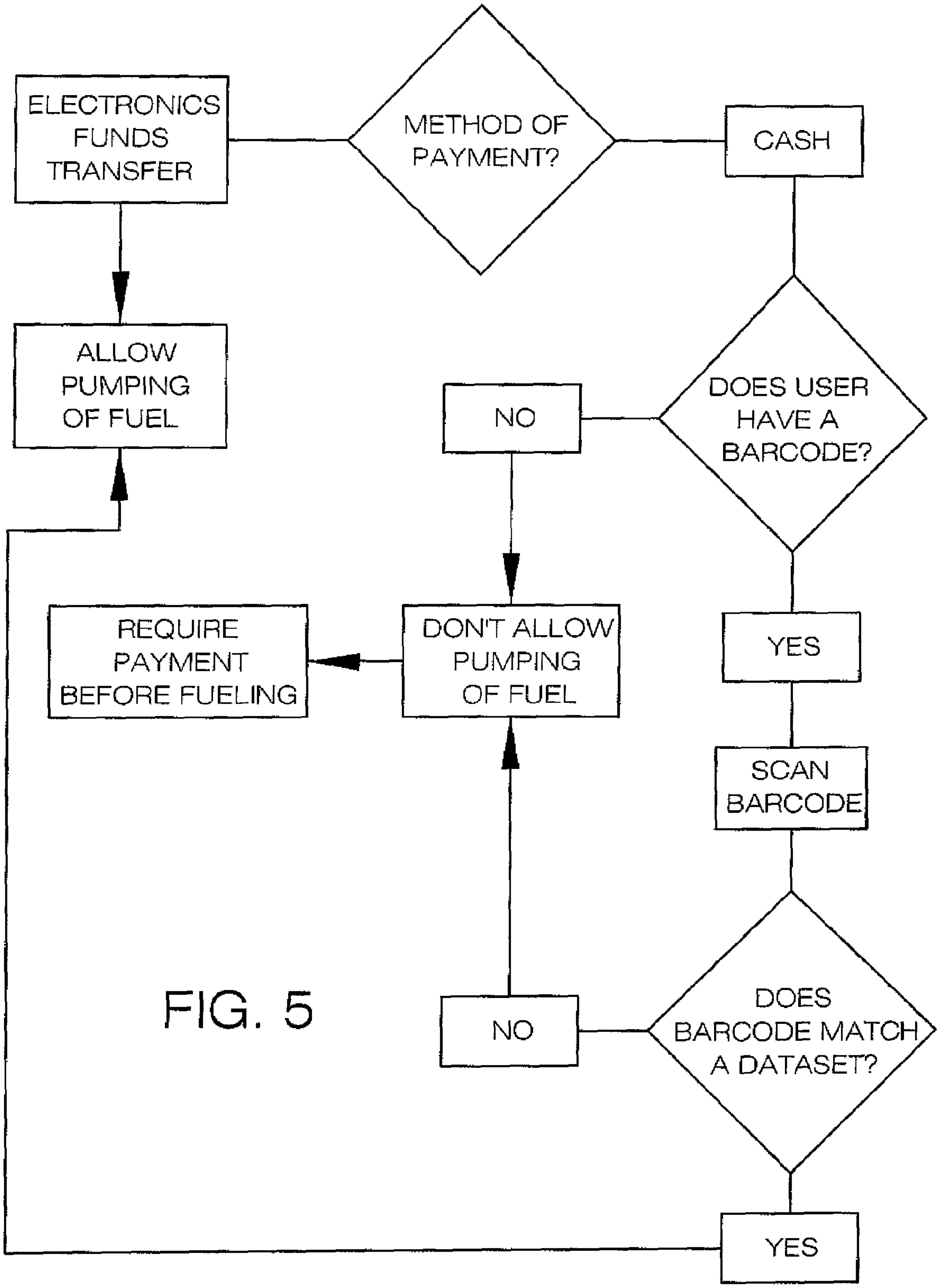
FIG. 5 is a schematic view of the present invention.
Figure 6:
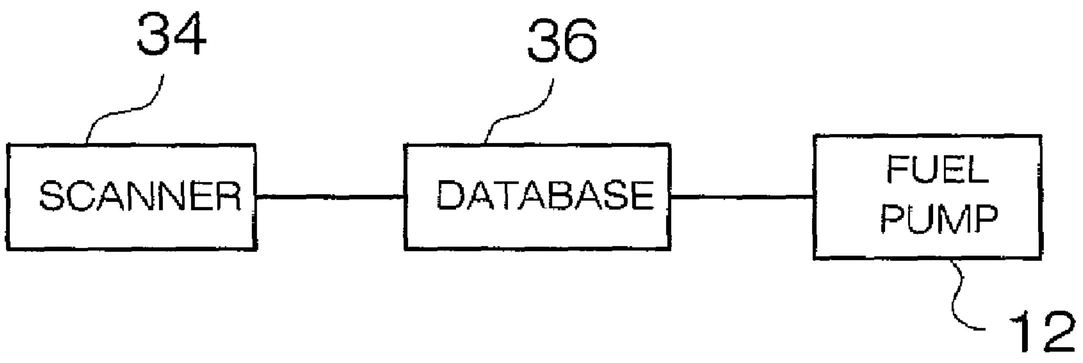
FIG. 6 is a schematic view of the present invention.

With reference now to the drawings, and in particular to FIGS. 1 through 7 thereof, a new fuel pumping device embodying the principles and concepts of the present invention and generally designated by the reference numeral 10 will be described.

As best illustrated in FIGS. 1 through 7, the fuel pumping system 10 generally comprises at least one substantially conventional fuel pump 12 that includes a fuel nozzle 14. Fuel is dispensable from the fuel nozzle 14 when the fuel pump 12 is turned on and the fuel nozzle 14 is actuated.

A plurality of vehicle identifications 16 is provided. Each vehicle 18, of a plurality of vehicles 18, has one of the vehicle identifications 16 positioned thereon. Each of the vehicle identifications 16 comprises a license plate mounted on a respective one of the vehicles 18. While the vehicle identification number (VIN) of the vehicles 18 may also be used, the license plate is preferable as it must be re-registered every year and therefore can more readily track the owner, and presumably the operator, of the vehicle 18.

A plurality of panels 20 is provided and each of the panels 20 has a different barcode indicia 22 thereon. Each of the barcode indicia 22 has information encoded therein corresponding to one of the vehicle identifications 16 so that each of the barcodes 22 matches one of the identifications numbers 16. Each of the panels 20 is mounted adjacent to a fuel receiving port 24 of a corresponding one of the vehicles 18. More preferably, the panels 20 are positioned within a fuel cap wells 25 of the vehicles 18. The panels 20 each have a first side 26 and a second side 28. The first sides 26 have the barcode indicia 22 thereon, while the second sides 28 have an adhesive thereon 30. The adhesive 30 secures each of the panels 20 to a respective one of the vehicles 18. It is preferred that the adhesive 30 is stronger than the panel 20 so that the panel 20 tears should someone attempt to remove it from the vehicle 18. A removable backing 32 may be positioned over the adhesive 30 before the panel 20 is attached to the vehicle 18. It should be noted that while the specification includes references to a plurality of fuel pumps 12, vehicles 18 and panels 20, only one of each has been shown in the Figures since further examples in the Figures would be redundant.

Figure 7:
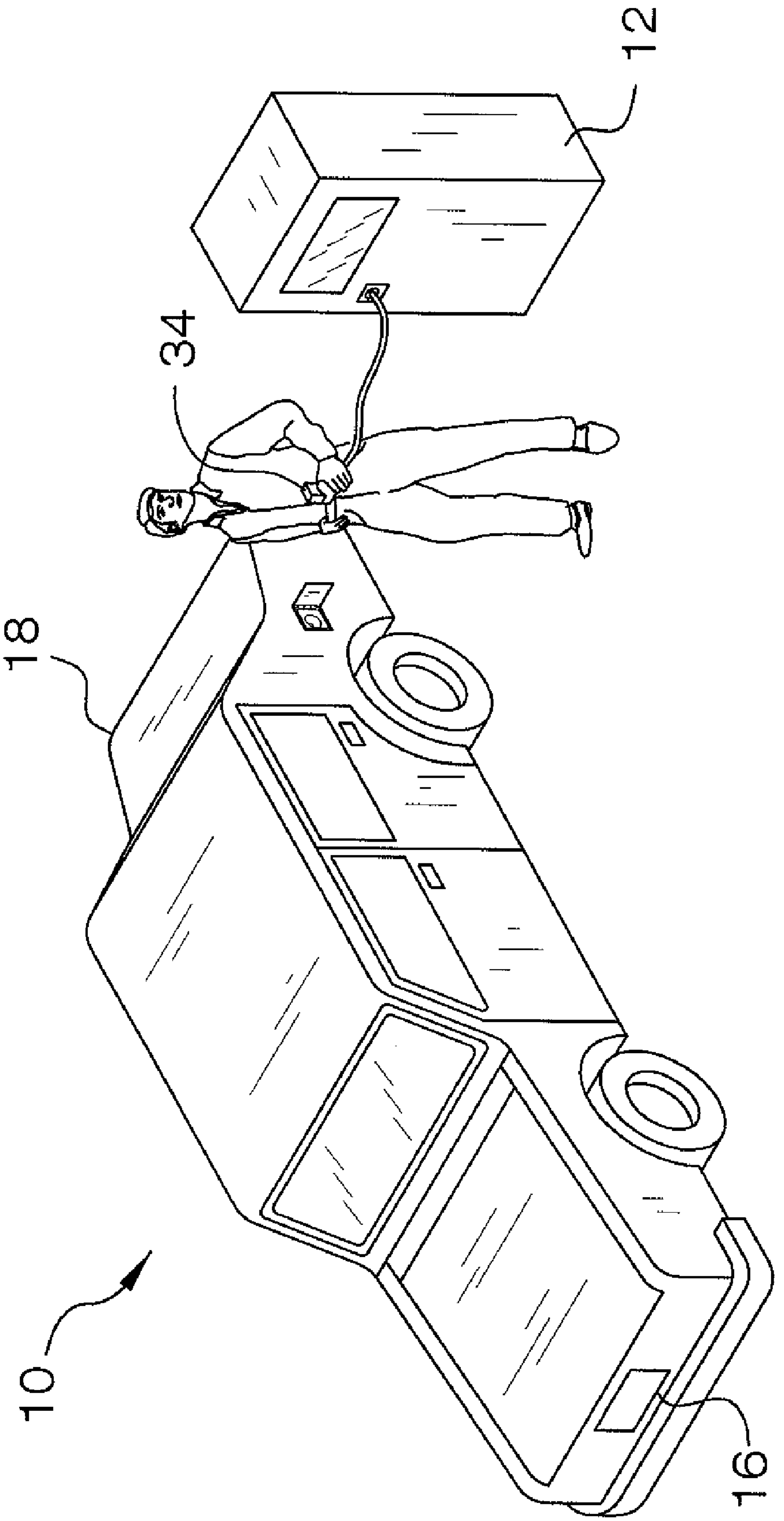
FIG. 7 is an in-use perspective view of an embodiment of the present invention having a scanner being separate from a fuel nozzle.

As shown in FIG. 1, a barcode scanner 34 may be mounted on the fuel nozzle 14. However, the barcode scanner 34, as shown in FIG. 7, may be separate from the fuel nozzle 14. The barcode scanner 34 is conventional and is configured for scanning each of the barcode indicia 22 and retrieving the information encoded therein. A database 36 is in communication with the barcode scanner. The database 36 may be hardwired to the barcode scanner 34 or in wireless communication with the barcode scanner 34. The database 36 electronically stores a plurality of datasets. Each of the datasets includes information from one of the barcode indicia 22 and a corresponding one of the vehicle identifications 16. The database 36 is operationally coupled to the at least one fuel pump 12 and allows the at least one fuel pump to pump fuel when the fuel nozzle 14 is actuated and the information retrieved by the barcode scanner 34 corresponds to one of the datasets stored in the database 36. In this way, fuel may only be dispensed from the fuel nozzle 14 when the information retrieved by the scanner 34 is stored in the database 36.

In use, typically, this system 10 will be used only when someone is paying with cash, as opposed to electronic funds, where the funds cannot be verified before the fuel is deposited in the vehicle 18. If the person attempts to leave the fuel pump without paying the cash for the fuel, the owner of the fuel pump will have the person's vehicle identification 16, which was scanned from the barcode 22. A licensing body, such as a state government, may supply the panels 20 having the barcodes 22 thereon when the license registration tabs are supplied to the owner of the vehicle 18. This will ensure that the barcodes 22 are continuously up to date. The positioning of the barcodes 22 and the scanner 34 allows the scanner 34 to quickly and efficiently scan the barcodes 22 and verify that the vehicle identification information 16 is in the database. This system 10 will make it will be impossible for a person fuel their vehicle without using electronic funds or electronically verifying their vehicle identification 16. Should a person not pay for their fuel after fueling their vehicle 18, their vehicle information 16 may be given to the local authorities for prosecution and recouping of the funds for the fuel.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fuel dispensing system for dispensing fuel into fuel receiving ports of a plurality of vehicles, said system including:

at least one fuel pump including a fuel nozzle, fuel being dispensable from said fuel nozzle when said fuel nozzle is actuated;

a plurality of vehicle identifications, each of the vehicles having one of said vehicle identifications positioned thereon;

a plurality of panels each having a different barcode indicia thereon, each of said barcode indicia having information encoded therein corresponding to one of said vehicle identifications, each of said panels being mounted adjacent to the fuel receiving port of a corresponding one of the vehicles;

a barcode scanner being configured for scanning each of said barcode indicia and retrieving the information encoded therein;

a database being in communication with said barcode scanner, said database storing a plurality of datasets, each of said datasets including information from one of said barcode indicia and a corresponding one of said vehicle identifications, said database being operationally coupled to said at least one fuel pump and allowing said at least one fuel pump to pump fuel when said fuel nozzle is actuated and the information retrieved by said barcode scanner corresponds to one of said datasets stored in said database.

2. The system according to claim 1, wherein each of said vehicle identifications comprising a license plate mounted on a respective one of the vehicles.

3. The system according to claim 1, wherein said panels are positioned within a fuel cap well of a respective one of the vehicles.

4. The system according to claim 1, wherein each of said panels is mounted adjacent to the fuel receiving port of a corresponding one of the vehicles.

5. The system according to claim 1, wherein each of said panels has a first side and a second side, said first sides each having said barcode indicia thereon, said second sides each having an adhesive thereon, said adhesive securing each of said panels to a respective one of the vehicles.

6. The system according to claim 1, wherein said barcode scanner is separate from and nozzle to position said barcode scanner outside of said fuel port when said barcode indicia is being scanned.

7. A fuel dispensing system for dispensing fuel into fuel receiving ports of a plurality of vehicles, said system including:

at least one fuel pump including a fuel nozzle, fuel being dispensable from said fuel nozzle when said fuel nozzle is actuated;

a plurality of vehicle identifications, each of the vehicles having one of said vehicle identifications positioned thereon, each of said vehicle identifications comprising a license plate mounted on a respective one of the vehicles;

a plurality of panels each having a different barcode indicia thereon, each of said barcode indicia having information encoded therein corresponding to one of said vehicle identifications, each of said panels being mounted adjacent to the fuel receiving port of a corresponding one of the vehicles, each of said panels having a first side and a second side, said first sides each having said barcode indicia thereon, said second sides each having an adhesive thereon, said adhesive securing each of said panels to a respective one of the vehicles;

a barcode being configured for scanning each of said barcode indicia and retrieving the information encoded therein;

a database being in communication with said barcode scanner, said database storing a plurality of datasets, each of said datasets including information from one of said barcode indicia and a corresponding one of said vehicle identifications, said database being operationally coupled to said at least one fuel pump and allowing said at least one fuel pump to pump fuel when said fuel nozzle is actuated and the information retrieved by said barcode scanner corresponds to one of said datasets stored in said database, wherein fuel may only be dispensed from said fuel nozzle when the information retrieved by said barcode scanner is stored in said database.

8. The system according to claim 7, wherein said barcode scanner is separate from and nozzle to position said barcode scanner outside of said filet port when said barcode indicia is being scanned.

9. A method of dispensing fuel comprising the steps of:

providing a vehicle having a fuel receiving port;

providing a fuel pump including a fuel nozzle, fuel being dispensable from said fuel nozzle when said fuel nozzle is actuated;

providing a vehicle identification positioned on the vehicle;

providing a panel each having barcode indicia thereon, said barcode indicia having information encoded therein corresponding to said vehicle identification, said first side having said barcode indicia thereon, said second side having an adhesive thereon;

mounting said panel adjacent to the fuel receiving port, said panel having a first side and a second side, said adhesive securing said panel to the vehicle;

providing a barcode scanner being configured for scanning said barcode indicia and retrieving the information encoded therein;

providing a database being in communication with said barcode scanner, said database storing a dataset, said dataset including information from said barcode indicia and said vehicle identification, said database being operationally coupled to said fuel pump and allowing said fuel pump to pump fuel when a person is paving with cash only after said fuel nozzle is actuated and the information retrieved by said barcode scanner corresponds to said dataset stored in said database, wherein fuel may only be dispensed from said fuel nozzle when the information retrieved by said barcode scanner is stored in said database;

scanning said barcode with said barcode scanner;

matching the information retrieved on said barcode with said dataset;

actuating said fuel nozzle and pumping fuel into said fuel receiving port after the information retrieved matches said dataset.

* * * * *